(12) United States Patent
Ulanov et al.

(10) Patent No.: US 12,483,423 B2
(45) Date of Patent: Nov. 25, 2025

(54) SYSTEMS AND METHODS FOR CONFIGURATION-DRIVEN PROCESSING OF DATA VIA A CONFIGURATION SERVICE

(71) Applicant: DigiCert, Inc., Lehi, UT (US)

(72) Inventors: Ruslan Ulanov, Dallas, TX (US); Atul Gupta, Cupertino, CA (US)

(73) Assignee: DigiCert, Inc., Lehi, UT (US)

( * ) Notice: Subject to any disclaimer, the term of this patent is extended or adjusted under 35 U.S.C. 154(b) by 253 days.

(21) Appl. No.: 18/353,267

(22) Filed: Jul. 17, 2023

(65) Prior Publication Data

US 2025/0030555 A1    Jan. 23, 2025

(51) Int. Cl.
*H04L 9/32* (2006.01)
*G06F 16/11* (2019.01)

(52) U.S. Cl.
CPC .......... *H04L 9/3247* (2013.01); *G06F 16/113* (2019.01); *G06F 16/116* (2019.01); *H04L 9/3268* (2013.01)

(58) Field of Classification Search
CPC .... H04L 9/3247; H04L 9/3268; G06F 16/113; G06F 16/116
USPC ....................................................... 713/193
See application file for complete search history.

(56) References Cited

U.S. PATENT DOCUMENTS

| | | |
|---|---|---|
| 10,567,075 B2 | 2/2020 | Tyagi et al. |
| 11,303,616 B2 | 4/2022 | Kumar et al. |
| 11,595,217 B2 | 2/2023 | Kumar et al. |
| 2019/0166117 A1 | 5/2019 | Kumar et al. |
| 2021/0357352 A1 | 11/2021 | Anand et al. |
| 2022/0398322 A1 | 12/2022 | Kumar et al. |
| 2023/0208652 A1 | 6/2023 | Kumar et al. |
| 2024/0112532 A1* | 4/2024 | Butler ................. G07F 17/3209 |
| 2024/0126524 A1* | 4/2024 | Fischer ................. G06F 9/5072 |

FOREIGN PATENT DOCUMENTS

| | | | | |
|---|---|---|---|---|
| CN | 113821267 A | * | 12/2021 | ......... G06F 9/45558 |
| WO | 2022175826 A1 | | 8/2022 | |

* cited by examiner

*Primary Examiner* — Zi Ye
(74) *Attorney, Agent, or Firm* — Baratta Law PLLC; Lawrence A. Baratta, Jr.

(57) ABSTRACT

Systems and methods for configuration-driven processing of data via a configuration service include receiving a batch of archived data with contents that include a configuration file and one or more resources; validating the batch of archived data; responsive to the validating, extracting the contents of the batch of archived data; and processing the one or more resources based on the configuration file, to configure a service with the one or more resources, wherein the configuration file defines a type of each of the one or more resources, a relationship between the one or more resources, and any actions to be performed on the one or more resources.

18 Claims, 3 Drawing Sheets

SYSTEMS AND METHODS FOR CONFIGURATION-DRIVEN PROCESSING OF DATA VIA A CONFIGURATION SERVICE

FIELD OF THE DISCLOSURE

The present disclosure relates generally to networking and computing. More particularly, the present disclosure relates to systems and methods for configuration-driven processing of data via a configuration service.

BACKGROUND OF THE DISCLOSURE

There are various approaches to deploying computer resources, such as microservices, software containers, dockers, etc., deployed in the cloud, on physical servers, on virtual machines (VMs), and the like. As described herein, these computer resources are generally referred to as services. Services are configured to communicate on a network, e.g., the Internet, and to perform some functionality. A service is a self-contained unit of functionality and services can be combined to provide the functionality of a large software application. A processing device or groups of devices can run any number of services, and each service is built in a way that ensures that the service can exchange information with any other service in the network without human interaction and without the need to make changes to the underlying program itself. Microservices are small units of functionality characterized as independently deployable, loosely coupled to one another, organized, and managed by a small team. This approach enables an organization to deliver large, complex applications rapidly, frequently, reliably and sustainably.

A container is a standard unit of software that packages up code and all its dependencies so the application runs quickly and reliably from one computing environment to another. A Docker container image is a lightweight, standalone, executable package of software that includes everything needed to run an application: code, runtime, system tools, system libraries and settings. Container images become containers at runtime and in the case of Docker containers—images become containers when they run on Docker Engine.

The conventional approach of configuration is complex and time-consuming, typically requiring operations for each new configuration. For example, the typical approach involves shell scripts which are customized for each deployment, as well as for each update to a given deployment.

BRIEF SUMMARY OF THE DISCLOSURE

The present disclosure relates to systems and methods for configuration-driven processing of data via a configuration service. The configuration is configured to receive a validated and secure batch of archived data which includes a configuration file (e.g., JavaScript Object Notation (JSON)). The configuration file defines resources in a batch, its type, its relation to other resources, the action to be performed on the resource, etc. The configuration service is configured to extract, validate, and read the configuration file and correspondingly process the resources based thereon. Advantageously, it is possible to update configuration using the format of the configuration service, without complexity and with significantly improved speed.

In various embodiments, the present disclosure includes a method having steps, a processing device configured to implement the steps, a cloud service configured to implement the steps, and a non-transitory computer-readable medium storing instructions that, when executed, cause one or more processors to implement the steps. The steps can include receiving a batch of archived data with contents that include a configuration file and one or more resources; validating the batch of archived data; responsive to the validating, extracting the contents of the batch of archived data; and processing the one or more resources based on the configuration file, to configure a service with the one or more resources, wherein the configuration file defines a type of each of the one or more resources, a relationship between the one or more resources, and any actions to be performed on the one or more resources.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for configuration-driven processing of data via a configuration service. The configuration service is configured to receive a validated and secure batch of archived data which includes a configuration file (e.g., JavaScript Object Notation (JSON)). The configuration file defines resources in a batch, its type, its relation to other resources, the action to be performed on the resource, etc. The configuration service is configured to extract, validate, and read the configuration file and correspondingly process the resources based thereon. Advantageously, it is possible to update configuration using the format of the configuration service, without complexity and with significantly improved speed.

Definitions

Service—a software process, executed on a server, in the cloud, etc. that provides a self-contained unit of functionality. Multiple services can be combined to provide the functionality of a large software application. The present disclosure contemplates any implementation of a service, i.e., a microservice, a docker, a container, etc.

Configuration service—a service described herein that is configured to perform configuration-driven processing of data for configuring other services.

JSON—JavaScript Object Notation—an open standard file format and data interchange format that uses human-readable text to store and transmit data objects consisting of attribute-value pairs and arrays. It is a common data format with diverse uses in electronic data interchange, including that of web applications with servers.

Archive file—a batch of archived data with a configuration file (e.g., JSON) and resources that are processed by the configuration service for configuring other services. The archive file can be a single file, such as a ZIP file.

Resource—data in the archive file for configuration and processing by the configuration service. An example resource can be a certificate, including various different types of certificates, e.g., Transport Layer Security (TLS) certificate, client certificate, etc. Generally, the resources in the batch of archived data can include certificates, keys, binaries, etc.

Certificate—A public key certificate, also known as a digital certificate or identity certificate (referred to herein as "certificate"), is an electronic document used to prove the validity of a public key. The certificate includes information about the key, information about the identity of its owner (called the subject), and the digital signature of an entity that has verified the certificate's contents (called the issuer). If the signature is valid, and the software examining the certificate trusts the issuer, then it can use that key to communicate securely with the certificate's subject. In a typical public-key infrastructure (PKI) scheme, the certificate issuer is a certificate authority (CA), usually a company that charges customers to issue certificates for them.

Configuration Service

Figure 1:
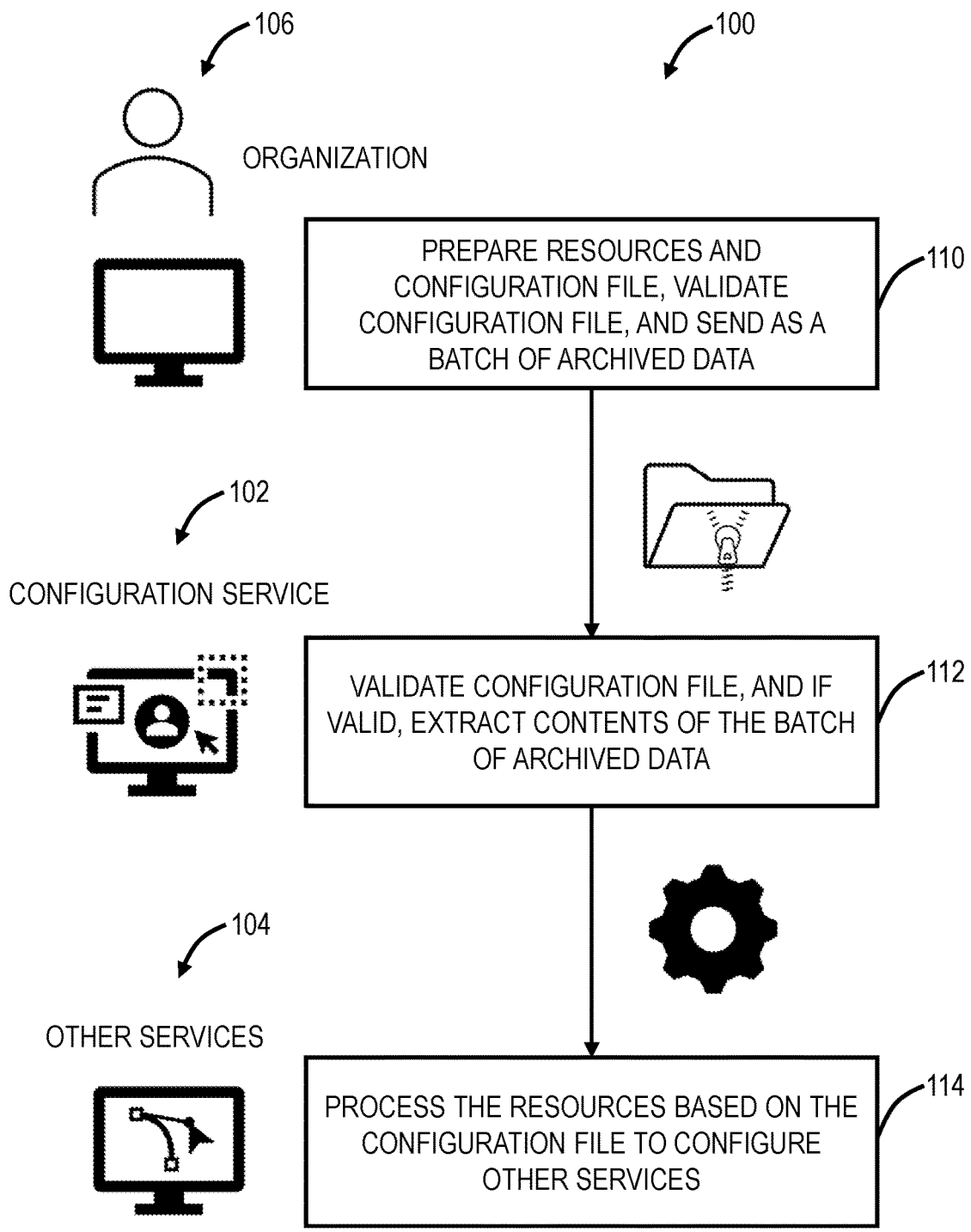
FIG. 1 is a network diagram of a network illustrating workflow associated with a configuration service and associated interaction therewith for configuration of other services.
Figure 2:
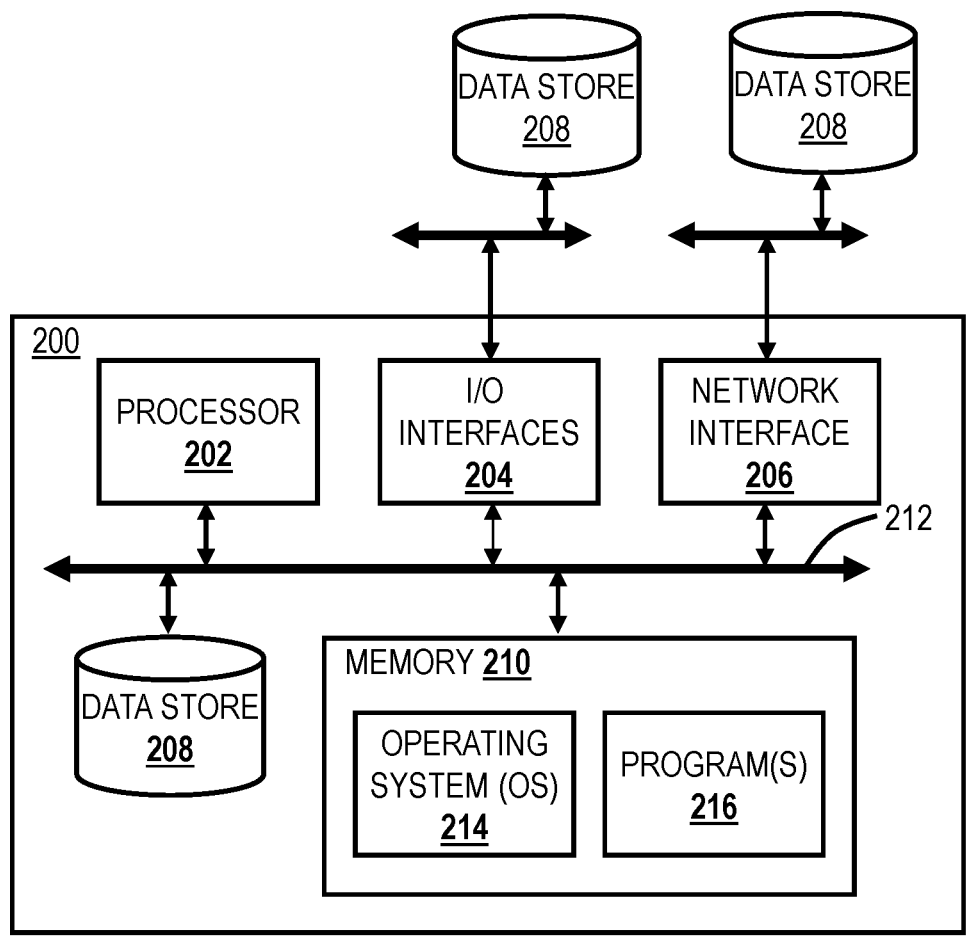
FIG. 2 is a block diagram of a processing system.

FIG. 1 is a network diagram of a network 10 illustrating workflow associated with a configuration service 102 and associated interaction therewith for configuration of other services 104. The configuration service 102 is a generically defined service that is configured to perform batch processing of resources based on a configuration file. The processing is to configure the resources for other services 104. The services 102, 104 are configured to operate on one or more processors, in a network environment, such as via one or more processing devices 200, as illustrated in FIG. 2. The services 102, 104 are configured to communicate with one another over a network, and the services 104 are configured to perform some functionality. The objective of the configuration service 102 is to configure the services 104. Note, the services 104 can be one or more services. The configuration service 102 is configured to functionally receive a specified format of data and perform batch processing of that data.

The configuration service 102 can be used to configure various aspects of the services 104 including certificates, keys, passwords, etc. When being deployed, the services 104 need provisioning with the proper files. The configuration service 102 is a generically defined service configured to perform such provisioning and configuring. The configuration service 102 is configured to perform batch processing of different types of data based on a descriptor file, i.e., a configuration file. The batch processing includes specified actions. Advantageously, the configuration service 102 is generic in that a user can perform configuration of any of the services 104 based on the functionality of the configuration service 102, i.e., there is no need to write customized scripts, perform manual processing, etc. That is, the configuration service 102 is defined once and reusable, i.e., just send new data to the same configuration service 102.

The services 104 are associated with an organization 106, i.e., an entity, user, etc. that owns/controls the services 104. The organization 106 needs to configure, provision, deploy, etc. the services 104. As such, the organization 106 prepare resources and a configuration file, validates the configuration file, and sends, to the configuration service 102, the resources and configuration file as a batch of archived data (step 110). Note, the organization 106 knows in advance how the configuration service 102 operates and prepares the batch of archived data accordingly. In an embodiment, the configuration file is in JSON format, and the batch of archived data is a ZIP file or some other format of compression where a single file contains multiple other files, i.e., the resources and the configuration file. Also, in an embodiment, the services 102, 104 can be deployed as software containers.

The configuration service 102 is configured to receive the batch of archived data, validate the configuration file, and if valid, extract contents of the batch of archived data (step 112) and process the resources based on the configuration file to configure the other services 104 (step 114). The batch of archived data is received by the configuration service 102, e.g., a ZIP file. The batch of archived data includes the configuration file, e.g., JSON, which can be digitally signed. The configuration file defines each resource in the batch of archived data, its type, its relation to other resources, the action to be performed on the resource, and the like. The configuration service 102 extracts and reads the configuration file, verifies its authenticity and starts processing resources.

The configuration service 102 can perform various actions for configuring the other services 104. Some example non-limiting actions can include:

(1) "copy": copy a resource in the batch of archived data to a specified destination path, for another service 104.

(2) "template": read a resource in the batch of archived data, substitute templatized properties with actual values, and store the resource at a defined path, for the another service 104.

(3) "convert-p12": read a certificate, key, and key's password from the batch of archived data, produce a PKCS12 file, and store the resource at a defined path batch of archived data. In cryptography, PKCS12 defines an archive file format for storing many cryptography objects as a single file. It is commonly used to bundle a private key with its X.509 certificate or to bundle all the members of a chain of trust.

Example Implementation

In an embodiment, for illustration purposes, the configuration service 102 can be used to configure a publisher service 104, referred to as a "field publisher" or FDP. Example parameters include Authentication:
(1) Application Programming Interface (API) Token (shared with all FDP init-container(s))
(2) API Key Secret (shared with all FDP init-container(s))

Request:
(1) location_id: Field Publisher Location ID
(2) timestamp: Request timestamp to prevent replay attacks An example ZIP file can contain the following structure

```
|—fdp_artifacts.json
|—/server_certs
|    |— tls_cert_with_chain.pem
|    |— tls_key.pem
|    |— edp_client_auth_key.pem
|    |— edp_client_auth_cert_with_chain.pem
|    |— fdp_client_auth_key.pem
|    |— fdp_client_auth_cert_with_chain.pem
|    |— ssl-trusted-certs.pem
|—/config
     |— server-config-prod.properties
     |— server_data.properties
     |— server.xml /*Tomcat specific template */
     |— host.conf
     |— env.sh
```

Using a separate key/cert instead of a single PKCS12 file will allow the init-container scripts to map the files directly to the usage flows. In addition, in case of upgrade of certificate(s) can be managed separately. Note: Issued Certificate artifacts received corresponding to the key for example tls_cert_with_chain.pem, fdp_client_auth_cert_with_chain.pem—can contain the intermediate issuer chain along with the leaf certificate. The processing script based on the init—container usage might require to split the same into multiple Privacy Enhanced Mail (PEM) files.

The fdp_artifacts.json provides configuration parameters in addition to the file artifacts shown above. Note: fdp_artifacts.json could mention the target path (custom extensions of which the init-container might not be aware).

Here is an example JSON configuration file:

```
{
    "fdp_name": "string",
    "fdp_location_id": "string",
    "fdp_location_uuid": "GUID",
    "fdp_url": "URI",
    "fdp_fqdn": "FQDN",
    "fdp_location_address":
    "optional",
    "fdp_location_city":
    "optional",
    "fdp_location_state":
    "optional",
    "fdp_location_country":
    "optional", "fdp_notes":
    "optional",
    "edp_connection_url": "URI",
    "edp_api_token":
    "BASE64_Encoded",
    "edp_token_secret":
    "BASE64_Encoded",
    "fdp_mauth_enabled": true,
    "synchronization_frequency": 24, /* hours */ "configuration_files":
    [
        {
            "filename":
            {
                "input_path":
                "/path_in_zip/file.pem",
                "usage": "key|certificate|ca",
                "secret": "BASE64_Encoded"
            },
            "output_path":
            "/expected_path_on_fdp/file.pem",
            "actions": [ "template", "copy",
            "java_cacerts" ]
        },
        {
            "filenames
            ": [
                {
                    "input_path" :
                    "/path_in_zip/file.pem", "usage" :
                    "certificate|ca"
                },
                {
                    "input_path" :
                    "./path_in_zip/key_file.pem", "usage"
                    : "key",
                    "secret": "BASE64_Encoded"
                }
            ],
            "output_path" :
            "/expected_path_on_fdp/file.p12",
            "actions" : [ "convert_p12", "copy" ]
        }
    ]
}
```

The following templatized parameters can be used by the initialization container's script(s) to specialize the templates received from the configuration service 102 for provisioning of an FDP portal.

| Parameter | Used in | Description |
| --- | --- | --- |
| @CLIENT_MAUTH_CERT_PATH@ | env.sh | Path to client authentication certificate PEM file. |
| @CLIENT_MAUTH_KEY_PATH@ | env.sh | Path to client authentication certificate private key's PEM file. |
| @CLIENT_MAUTH_KEY_PASS@ | env.sh | Password for client authentication certificate private key if it's encrypted, empty Jotherwise. |
| @SHARED_SECRET@ | server-config-prod.properties | Symmetric key used to encrypt sensitive data in the database. Autogenerated at initialization. |
| @SERVER_URL@ | server-config-prod.properties | Full Uniform Resource Locator (URL) of the FDP portal, used in the server's responses. |
| @HOST_FQDN@ | host.conf, server.xml | Fully Qualified Domain Name (FQDN) of FDP portal, used in Tomcat configuration to prevent redirection attacks through HOST headers. |
| @DB_HOSTNAME@ | server_data.properties | Database (DB) hostname. |
| @DB_USERNAME@ | server_data.properties | DB account. Autogenerated at initialization. |
| @DB_PASSWORD@ | server_data.properties | DB password. Autogenerated at initialization. |
| @TRUSTSTORE_PASSWORD@ | server-config-prod.properties | Password used to access the Java keystore. Autogenerated at initialization. |
| @TLS_TRUSTED_CERTS_PATH@ | server.xml | Path to server's trust chain (PEM) for client authentication. |
| @CLIENT_MAUTH_MODE@ | server.xml | Set to required if client authentication is enabled, set to none is not enabled. |

| Parameter | Used in | Description |
| --- | --- | --- |
| @SERVER_TLS_CERT_PATH@ | server.xml | Path to server's TLS certificate (PEM) |
| @SERVER_TLS_KEY_PATH@ | server.xml | Path to server's TLS certificate's key (PEM) |
| @SERVER_TLS_KEY_PASSWORD@ | server.xml | Password of server's TLS certificate's key |
| @SERVER_TLS_CERT_CHAIN_PATH@ | server.xml | Server's TLS certificate trust chain (PEM). |

Validation of the Configuration File

In an embodiment, the configuration file can be digitally sign by the organization 106 and verified by the configuration service 102, e.g., adding organizational identity to the sender and receiver to increase the level of trust. Either the configuration file or the archive file can be cryptographically signed, e.g., utilizing a code signing or document signing process. For example, the organization 104 can have an Extended Validation (EV) Certificate. An EV is a certificate conforming to X.509 that proves the legal entity of the owner and is signed by a certificate authority key that can issue EV certificates. EV certificates can be used in the same manner as any other X.509 certificates, including securing web communications with HTTPS and signing software and documents.

In an embodiment, the organization 106 can sign a JSON configuration file. For example, the following is an example of a signed JSON format:

```
{
  "body": {
    "node1": "val1",
    "node2": "val2",
    "nodeN": "valN"
  },
  "signature": {
    "algo_id" : "ECC-SHA384",
    "sig_value" :
"xfuYeNcEK7pjtPjjiv8H4H4zw68J6DjWWc8viWBWump7FEXerPn7o0/8M947oTRJd
4hYaCM1mMKIgzQ9j6Q7hg==",
    "sig_cert" : "-----BEGIN CERTIFICATE-----
\nMIIDmTCCAx+gAwIBAgIgRaH...snip...P\n854H9lC6NJ9x59rLHQ==\n-----
END CERTIFICATE-----"
  }
}
```

The "sig_value" is generated by digesting the "body" node of the JSON and signing it using the "algo_id" algorithm with the key corresponding to the certificate attached in "sig_cert" value. This is generated by the organization 106.

On the receiving end, the configuration service 102 is configured to (1) ensure the signing certificate "sig_cert" is trusted, by looking up its issuer certificate in the application's trust store, (2) verify the "sig_value" signature, and (3) consume the "body" only if the above two steps have been successfully validated, i.e., the body being the resources and specified actions.

Processing System

FIG. 2 is a block diagram of a processing system 200. The processing system 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the processing system 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing system 200, a semiconductor-based microprocessor (in the form of a microchip or chipset), or generally any device for executing software instructions. When the processing system 200 is in operation, the processor 202 is configured to execute software stored within the memory 210, to communicate data to and from the memory 210, and to generally control operations of the processing system 200 pursuant to the software instructions. The I/O interfaces 204 may be used to receive user input from and/or for providing system output to one or more devices or components.

The network interface 206 may be used to enable the processing system 200 to communicate on a network, such as the Internet. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Of note, the general architecture of the processing system 200 can define any device configured to implement the services 102, 104. However, the processing system 200 is merely presented as an example architecture for illustration purposes. Other physical embodiments are contemplated, including virtual machines (VM), software containers, appliances, network devices, cloud infrastructure, and the like.

In another embodiment, one or more processing systems 200 can be configured in a cluster and/or in a cloud system, for the services 102, 104. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

Process

Figure 3:
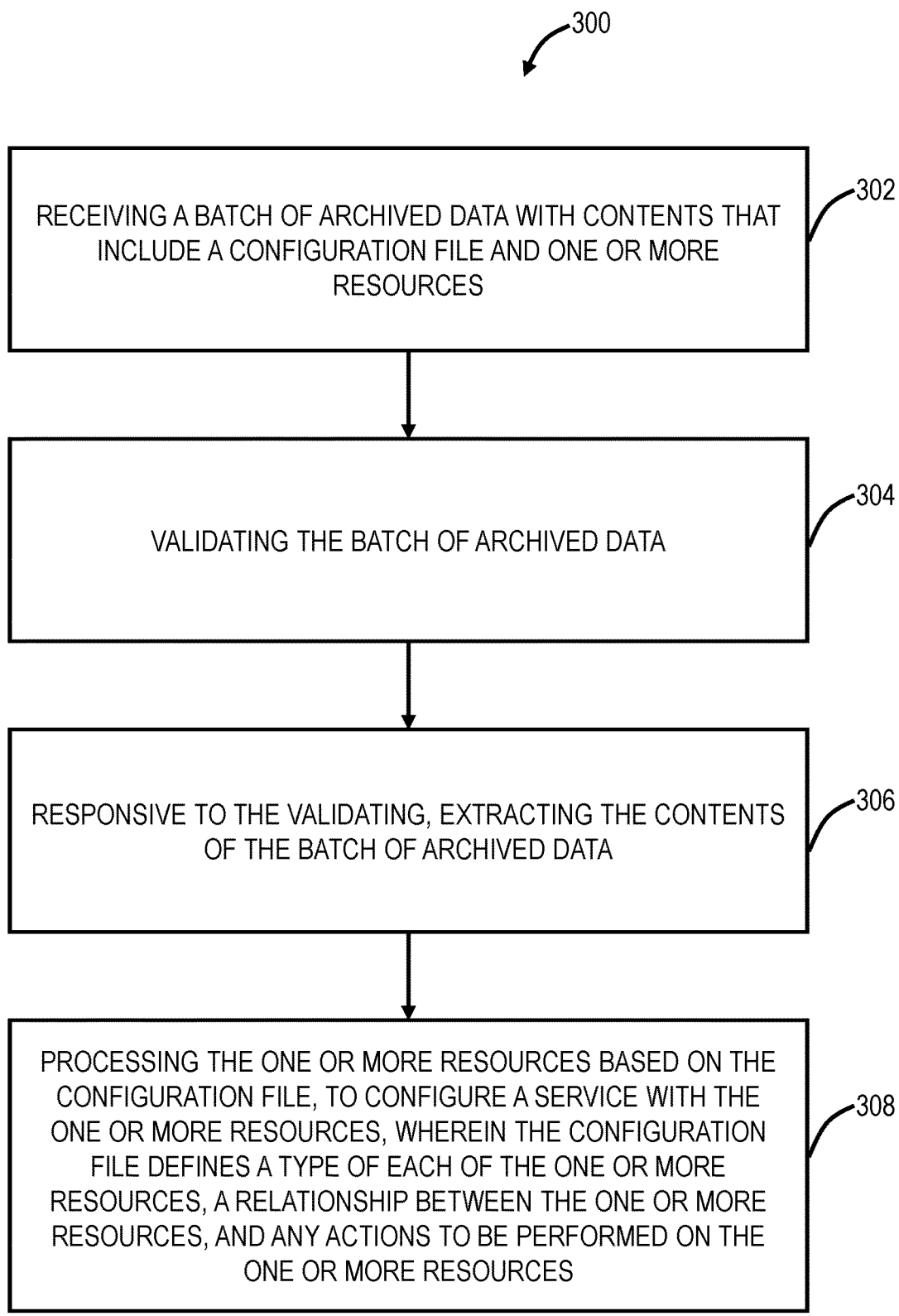
FIG. 3 is a flowchart of a process for configuration-driven processing of data via the configuration service.

FIG. 3 is a flowchart of a process 300 for configuration-driven processing of data via the configuration service 102. The process 300 contemplates implementation as a method having steps, via one of more of the processing devices 200 configured to implement the steps, and via instructions stored in a non-transitory computer-readable medium that, when executed, cause one or more processors to perform the steps.

The process 300 includes receiving a batch of archived data with contents that include a configuration file and one or more resources (step 302); validating the batch of archived data (step 304); responsive to the validating, extracting the contents of the batch of archived data (step 306); and processing the one or more resources based on the configuration file, to configure a service with the one or more resources, wherein the configuration file defines a type of each of the one or more resources, a relationship between the one or more resources, and any actions to be performed on the one or more resources (step 308).

The configuration file can utilize JavaScript Object Notation (JSON) format. The batch of archived data can be a single compressed file, e.g., a ZIP file. The one or more resources can include any of certificates, keys, and binaries.

The actions can include copying a resource of the one or more resources to a specified destination path for the service. The actions can include reading a resource of the one or more resources, substituting templatized properties in the resource with actual values, and copying the resource to a specified destination path for the service. The actions can include reading a resource of the one or more resources, wherein the resource includes a certificate, key, and password for the key; producing an archive file format for storing cryptography objects as a single file; and copying the archive file format to a specified destination path for the service.

The validating the batch of archived data can include validating a digital signature from an organization publishing the batch of archived data includes. The digital signature can be in the configuration file which utilizes JavaScript Object Notation (JSON) format. The validating the digital signature can include looking up an issuer certificate and verifying a signature value.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A non-transitory computer-readable medium comprising instructions that, when executed, cause one or more processors, executing a configuration service, to perform steps of:
   receiving a batch of archived data with contents that include a configuration file and one or more resources;
   validating the batch of archived data;
   responsive to the validating, extracting the contents of the batch of archived data; and
   processing the one or more resources based on the configuration file, to configure a service with the one or more resources, wherein the configuration file defines a type of each of the one or more resources, a relationship between the one or more resources, and any actions to be performed on the one or more resources, wherein the actions include:
      reading a resource of the one or more resources, wherein the resource includes a certificate, key, and password for the key;
      producing an archive file format for storing cryptography objects as a single file; and
      copying the archive file format to a specified destination path for the service.

2. The non-transitory computer-readable medium of claim 1, wherein the configuration file utilizes JavaScript Object Notation (JSON) format.

3. The non-transitory computer-readable medium of claim 1, wherein the batch of archived data is a single compressed file.

4. The non-transitory computer-readable medium of claim 1, wherein the one or more resources include any of certificates, keys, and binaries.

5. The non-transitory computer-readable medium of claim 1, wherein the actions include copying a resource of the one or more resources to a specified destination path for the service.

6. The non-transitory computer-readable medium of claim 1, wherein the actions include reading a resource of the one or more resources, substituting templatized properties in the resource with actual values, and copying the resource to a specified destination path for the service.

7. The non-transitory computer-readable medium of claim 1, wherein the validating the batch of archived data includes validating a digital signature from an organization publishing the batch of archived data includes.

8. The non-transitory computer-readable medium of claim 7, wherein the digital signature is in the configuration file which utilizes JavaScript Object Notation (JSON) format.

9. The non-transitory computer-readable medium of claim 7, wherein the validating the digital signature includes looking up an issuer certificate and verifying a signature value.

10. A method comprising steps of:
    receiving a batch of archived data with contents that include a configuration file and one or more resources;
    validating the batch of archived data;
    responsive to the validating, extracting the contents of the batch of archived data; and
    processing the one or more resources based on the configuration file, to configure a service with the one or more resources, wherein the configuration file defines a type of each of the one or more resources, a relationship between the one or more resources, and any actions to be performed on the one or more resources, wherein the actions include:
       reading a resource of the one or more resources, wherein the resource includes a certificate, key, and password for the key;
       producing an archive file format for storing cryptography objects as a single file; and
       copying the archive file format to a specified destination path for the service.

11. The method of claim 10, wherein the configuration file utilizes JavaScript Object Notation (JSON) format.

12. The method of claim 10, wherein the batch of archived data is a single compressed file.

13. The method of claim 10, wherein the one or more resources include any of certificates, keys, and binaries.

14. The method of claim 10, wherein the actions include copying a resource of the one or more resources to a specified destination path for the service.

15. The method of claim 10, wherein the actions include reading a resource of the one or more resources, substituting templatized properties in the resource with actual values, and copying the resource to a specified destination path for the service.

16. The method of claim 10, wherein the validating the batch of archived data includes validating a digital signature from an organization publishing the batch of archived data includes.

17. The method of claim 16, wherein the digital signature is in the configuration file which utilizes JavaScript Object Notation (JSON) format.

18. The method of claim 16, wherein the validating the digital signature includes looking up an issuer certificate and verifying a signature value.

\* \* \* \* \*